(12) United States Patent
Tsuruzono

(10) Patent No.: US 8,756,308 B2
(45) Date of Patent: Jun. 17, 2014

(54) TERMINAL, NETWORK APPARATUS, NETWORK APPARATUS SEARCHING SYSTEM INCLUDING THE TERMINAL AND THE NETWORK APPARATUS, AND NETWORK APPARATUS SEARCHING METHOD

(75) Inventor: Kengo Tsuruzono, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 678 days.

(21) Appl. No.: 12/308,276

(22) PCT Filed: Mar. 31, 2008

(86) PCT No.: PCT/JP2008/056298
§ 371 (c)(1),
(2), (4) Date: Dec. 11, 2008

(87) PCT Pub. No.: WO2009/122482
PCT Pub. Date: Oct. 8, 2009

(65) Prior Publication Data
US 2010/0169473 A1    Jul. 1, 2010

(51) Int. Cl.
*G06F 15/16* (2006.01)
*G06F 3/01* (2006.01)
*G06F 13/38* (2006.01)

(52) U.S. Cl.
CPC ...... *G06F 15/16* (2013.01); *G06F 3/01* (2013.01); *G06F 13/385* (2013.01)
USPC ........................................ 709/224; 704/226

(58) Field of Classification Search
CPC ........... G06F 13/00; G06F 15/00; G06F 3/00; G01L 21/00
USPC .................. 709/217, 224; 704/270, E21.001; 715/736
See application file for complete search history.

(56) References Cited

U.S. PATENT DOCUMENTS

| | | | |
|---|---|---|---|
| 5,517,199 A * | 5/1996 | DiMattei | 342/357.31 |
| 6,693,512 B1 * | 2/2004 | Frecska et al. | 340/10.1 |
| 7,194,278 B1 * | 3/2007 | Cook | 455/461 |
| 7,583,197 B2 * | 9/2009 | Wesby Van Swaay | 340/573.4 |
| 2004/0021566 A1 * | 2/2004 | Hayashi et al. | 340/539.13 |
| 2005/0141302 A1 | 6/2005 | Maeda et al. | |
| 2005/0242918 A1 * | 11/2005 | Van Dongen et al. | 340/3.1 |
| 2006/0085579 A1 | 4/2006 | Sato | |

(Continued)

FOREIGN PATENT DOCUMENTS

| JP | 9-81516 | 3/1997 |
|---|---|---|
| JP | 2000-333273 | 11/2000 |

(Continued)

*Primary Examiner* — Tauqir Hussain
*Assistant Examiner* — Ebrahim Golabbakhsh
(74) *Attorney, Agent, or Firm* — McGinn IP Law Group, PLLC (57) ABSTRACT

The present invention has as its object providing a terminal capable of accurately searching for an apparatus installed near a user. The terminal connected to a network apparatus through a network includes a display section which performs a displaying operation and position searching means which, on receiving an instruction to make a search for the network apparatus, transmits a signal indicating specific content and then, on receiving a response signal from the network apparatus that receives the signal through the network, causes the display section to display information that shows that the network apparatus transmitting the response signal has received the signal.

19 Claims, 4 Drawing Sheets

(56) References Cited

U.S. PATENT DOCUMENTS

| | | | |
|---|---|---|---|
| 2006/0119468 A1* | 6/2006 | Van Swaay | 340/5.1 |
| 2008/0055632 A1 | 3/2008 | Oshiumi et al. | |
| 2008/0068150 A1* | 3/2008 | Nguyen et al. | 340/506 |
| 2008/0077255 A1* | 3/2008 | Gila et al. | 700/13 |
| 2008/0125140 A1* | 5/2008 | Udani | 455/456.1 |
| 2008/0242283 A1* | 10/2008 | Ruckart | 455/415 |
| 2009/0231958 A1* | 9/2009 | Wei et al. | 367/118 |
| 2010/0107119 A1* | 4/2010 | Libert et al. | 715/810 |

FOREIGN PATENT DOCUMENTS

| | | |
|---|---|---|
| JP | 2002-196994 | 7/2002 |
| JP | 2003-131784 | 5/2003 |
| JP | 2003-177980 | 6/2003 |
| JP | 2006-115196 | 4/2006 |
| JP | 2006-308848 | 11/2006 |
| JP | 2008-59335 | 3/2008 |
| WO | WO 2004/064332 A1 | 7/2004 |

* cited by examiner

| SEARCHING CLASS | RECEPTION DATE | TRANSMISSION DATE | IDENTIFIER |
|---|---|---|---|
| 0 | *** | ××× | PC1 |
| 1 | *** | ××× | PC1 |
| ⋮ | ⋮ | ⋮ | ⋮ |

Fig.5

TERMINAL, NETWORK APPARATUS, NETWORK APPARATUS SEARCHING SYSTEM INCLUDING THE TERMINAL AND THE NETWORK APPARATUS, AND NETWORK APPARATUS SEARCHING METHOD

TECHNICAL FIELD

The present invention relates to a terminal for searching for an apparatus connected through a network, a network apparatus connected to the terminal through the network, a network apparatus searching system including the terminal and the network apparatus, and a network apparatus searching method.

BACKGROUND ART

Networks have come into wide use in recent years and computers can be connected to a plurality of peripheral devices (for example, the projector) in a workplace. When such a computer is connected to a plurality of peripheral devices using the same application, the computer generally display icons which represent each of the peripheral devices and which prompt the user to select a peripheral device as the data destination. The user selects an icon causing the computer to transmit data to the peripheral device corresponding to the selected icon.

When an icon is displayed on a computer as a means of allowing a user to select a peripheral device as the destination of data, in general, information that indicates a positional relationship between the computer and each peripheral device is not displayed. For this reason, if the user does not ascertain in advance where a peripheral device is placed, the user may select a peripheral device placed far from his position (where the computer is located) as the destination of data. There has been proposed a system for solving such a problem, disclosed in, for example, Japanese Patent Laid-Open No. 2003-131784 (hereinafter, referred to as Patent Document 1).

The system described in Patent Document 1 includes a personal computer and a plurality of peripheral devices, and the personal computer and the plurality of peripheral devices are communicatively connected to one another through a network.

The system described in Patent Document 1 has been designed based on the assumption that a plurality of peripheral devices that are the same and different in application (services to be provided) are installed in places where a building and a floor are different.

Each peripheral device is supposed to store attribute information indicating its name, application, and position information (a building name and a floor name where it is installed). When the user inputs the application of a peripheral device to a personal computer and performs an operation causing the computer to search for the appropriate peripheral device, the personal computer makes a request to all the peripheral devices connected thereto through a network to provide attribute information. Next, the personal computer creates an attribute list indicating all pieces of attribute information received until a predetermined time has elapsed. Then, the personal computer searches for a peripheral device that corresponds to the application that the user inputs from the attribute list.

When the personal computer finds locates the peripheral device that corresponds to the application, the personal computer compares the position information of the peripheral device that corresponds to the application with that of the personal computer. The personal computer displays the peripheral device with icons that are different in size according to the comparison results. In the system described in Patent Document 1, the size of the icon displayed by the personal computer is largest when the building name and the floor name indicated in the position information between the personal computer and the peripheral device agree with each other. The icon becomes smaller in size than the above icon when the building name is the same but the floor name is different. The icon is the smallest in size when both the building name and the floor name are different.

In the system described in Patent Document 1, there is also proposed a case where latitude and longitude are used as position information. In this case, the position information of each peripheral device indicates latitude and longitude of a place where it is installed. The personal computer has a global positioning system (GPS) function for acquiring information indicating latitude and longitude of the present position.

When latitude and longitude are used as position information, the personal computer acquires the position information thereof using the GPS function to calculate distance between the personal computer and a peripheral device. The personal computer displays the peripheral device using icons that are different in size according to the calculated distance.

According to the system described in Patent Document 1, the personal computer displays icons indicating peripheral devices connected to the personal computer through a network such that the size of the icons varies according to the distance between a peripheral device and the personal computer. For this reason, when a plurality of peripheral devices with the same application are connected to the personal computer through a network, the user of the personal computer can distinguish peripheral devices that are installed close to the user.

DISCLOSURE OF THE INVENTION

In the system described in Patent Document 1, a positional relationship between the personal computer and a peripheral device depends on positional information held by the personal computer and the peripheral device respectively. For this reason, if the personal computer or the peripheral device is relocated and updating positional information of the relocated apparatus is not conducted, a problem may occur in that the actual positional relationship between the personal computer and the peripheral device does not match the size of the icon displayed by the personal computer.

In the system described in Patent Document 1, if the personal computer has a GPS function, the personal computer acquires the positional information at the present location by itself. For this reason, if only the personal computer is relocated, the above mentioned problem does not occur. If the peripheral device is relocated, however, the above problem may occur unless positional information is updated.

The position of the personal computer is supposed to be acquired by the GPS. If the personal computer is installed indoors, however, it is difficult for the personal computer to directly acquire time information from a GPS satellite, so that positioning accuracy is lowered.

In a radio network, there has been known a technique in which a peripheral device that is to be searched for sends back the received electric field strength, thereby allowing determination of the physical distance between a personal computer and a peripheral device. However, a search using radio causes a problem in that peripheral devices that are installed in adjacent meeting rooms and that are comparatively far away are also searched for. To preclude these problems, a device such as one that finely controls the radiation intensity of a radio or that provides the radio with directivity is required.

The present invention has as its object providing a technique for realizing a terminal that is capable of readily searching for apparatus installed nearby, a network apparatus connected to the terminal through a network, a network apparatus searching system including the terminal and the network apparatus, and a network apparatus searching method.

According to the present invention, to achieve the above object, a terminal connected to a network apparatus through a network includes: a display section which performs a displaying operation; and position searching means which, on receiving an instruction to make a search for the network apparatus, transmits a signal indicating specific content and then, on receiving a response signal from the network apparatus that receives the signal through the network, causes the display section to display information that shows that the network apparatus transmitting the response signal has received the signal.

According to the present invention, to achieve the above object, a network apparatus connected to a terminal through a network includes: receiving means which receives a signal indicating specific content when the terminal transmits the signal; and responding means which determines whether the receiving means has received the signal based on the output signal of the receiving means and which transmits a response signal indicating that the network apparatus has received the signal transmitted to the terminal if the responding means has determined that the receiving means has received the signal.

According to the present invention, to achieve the above object, a network apparatus searching system includes a terminal and a network apparatus connected to the terminal through a network, wherein the terminal includes: a display section which performs a displaying operation; and position searching means which, on receiving an instruction to make a search for the network apparatus, transmits a signal indicating specific content and then, on receiving a response signal from the network apparatus that receives the signal through the network, causes the display section to display information that shows that the network apparatus transmitting the response signal has received the signal; and the network apparatus includes: receiving means which receives the signal when the terminal transmits the signal; and responding means which determines whether the receiving means has received the signal based on the output signal of the receiving means and which transmits the response signal indicating that the network apparatus has received the signal transmitted to the terminal if the responding means has determined that the receiving means has received the signal.

According to the present invention, to achieve the above object, a network apparatus searching method used in a terminal connected to a network apparatus through a network includes: transmitting a signal indicating specific content on receipt of an instruction to search for the network apparatus; and displaying information showing that the network apparatus transmitting a response signal has received the signal on receipt of the response signal from the network apparatus that received the signal through the network.

According to the present invention, when a terminal transmits a signal, information that shows the presence of a network apparatus which receives the signal transmitted by the terminal can be displayed on the terminal based on a response signal transmitted from the network apparatus which receives the signal.

As described above, when a search is made for an apparatus installed near the terminal, position information of the terminal and apparatus is not used, but the result indicating whether or not the apparatus has received the signal transmitted from the terminal is used.

BEST MODE FOR CARRYING OUT THE INVENTION

A network apparatus searching system of the exemplary embodiment is described below with reference to the drawings.

Figure 1:
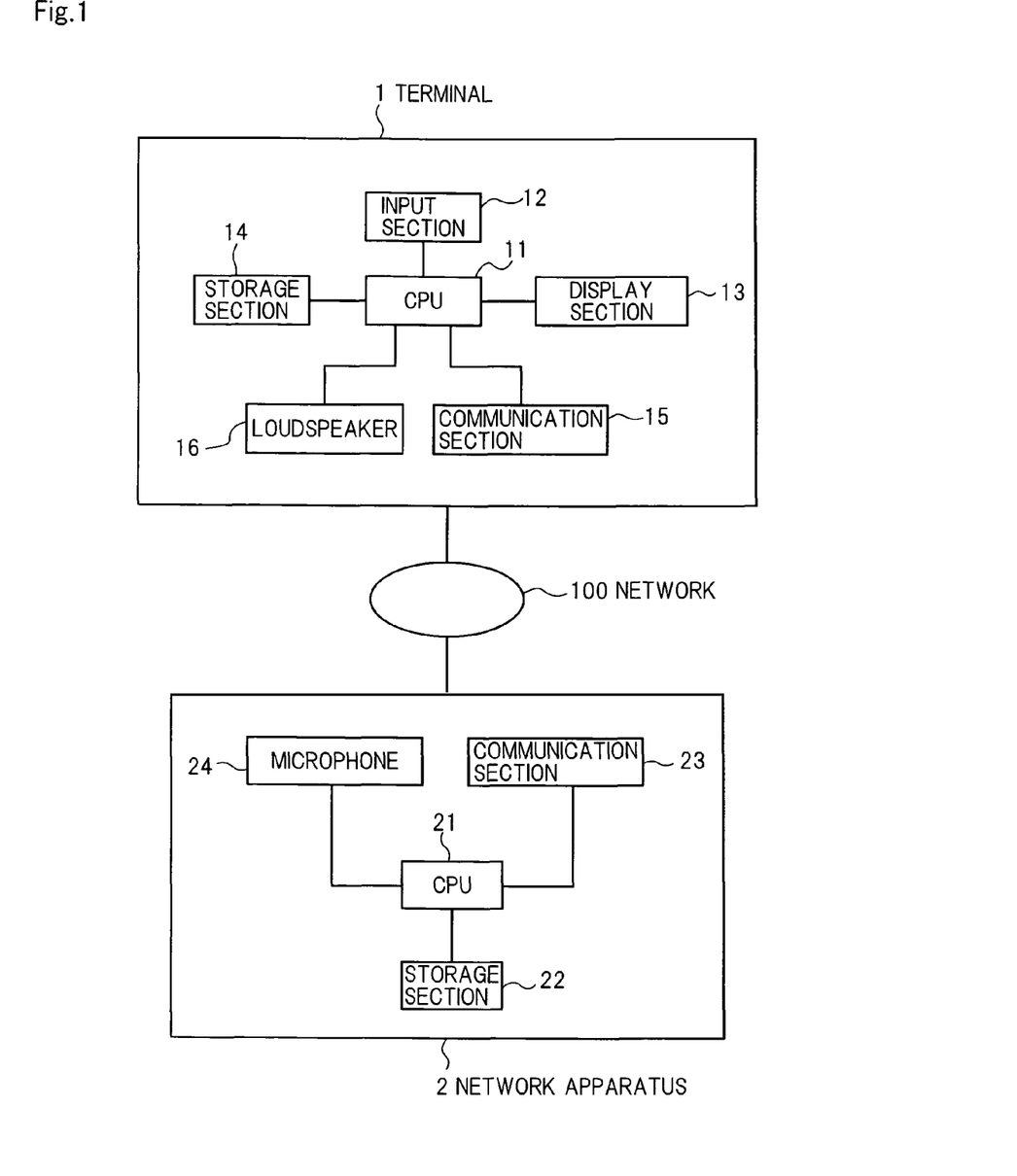
FIG. 1 is a block diagram illustrating a configuration of one exemplary embodiment of a network apparatus searching system according to the present invention.

FIG. 1 is a block diagram illustrating a configuration of one exemplary embodiment of a network apparatus searching system according to the present invention.

As illustrated in FIG. 1, the network apparatus searching system of the exemplary embodiment includes terminal 1 and network apparatus 2. Terminal 1 is communicatively connected to network apparatus 2 through network 100.

In the exemplary embodiment, although one terminal and one network apparatus are used for the sake of simplicity of description, the number of terminals and network apparatuses is not particularly limited in the present invention.

Terminal 1 is described below.

Terminal 1 is a personal computer, for example, and includes central processing unit (CPU) 11, input section 12, display section 13, storage section 14, communication section 15 and loudspeaker 16.

CPU 11 executes a predetermined process according to a program stored in storage section 14.

Input section 12 is one used for a user for operating terminal 1 and includes a keyboard and a mouse.

Display section 13 performs display in accordance with the control of CPU 11.

Storage section 14 stores programs for operating CPU 11 and various data created by CPU 11.

Communication section 15 performs data communication with network apparatus 2 through network 100 in accordance with the control of CPU 11.

Loudspeaker 16 outputs speech indicated by speech data when the speech data is inputted from CPU 11.

Network apparatus 2 is described below.

Network apparatus 2 is a peripheral device typified by a printer and a projector, for example, and includes CPU 21, storage section 22, communication section 23 and microphone 24.

CPU 21 executes a predetermined process according to a program stored in storage section 22.

Storage section 22 stores programs for operating CPU 21 and various data created by CPU 21.

Communication section 23 performs data communication with terminal 1 through network 100 in accordance with the control of CPU 21.

Microphone 24 receives speech, compares the intensity of the received speech with a threshold value, converts the result to a speech signal and outputs the signal to CPU 21.

The following describes how terminal 1 searches for the network apparatus in the network apparatus searching system according to the exemplary embodiment. Network apparatus 2 is supposed to communicate with terminal 1 herein.

Figure 2:
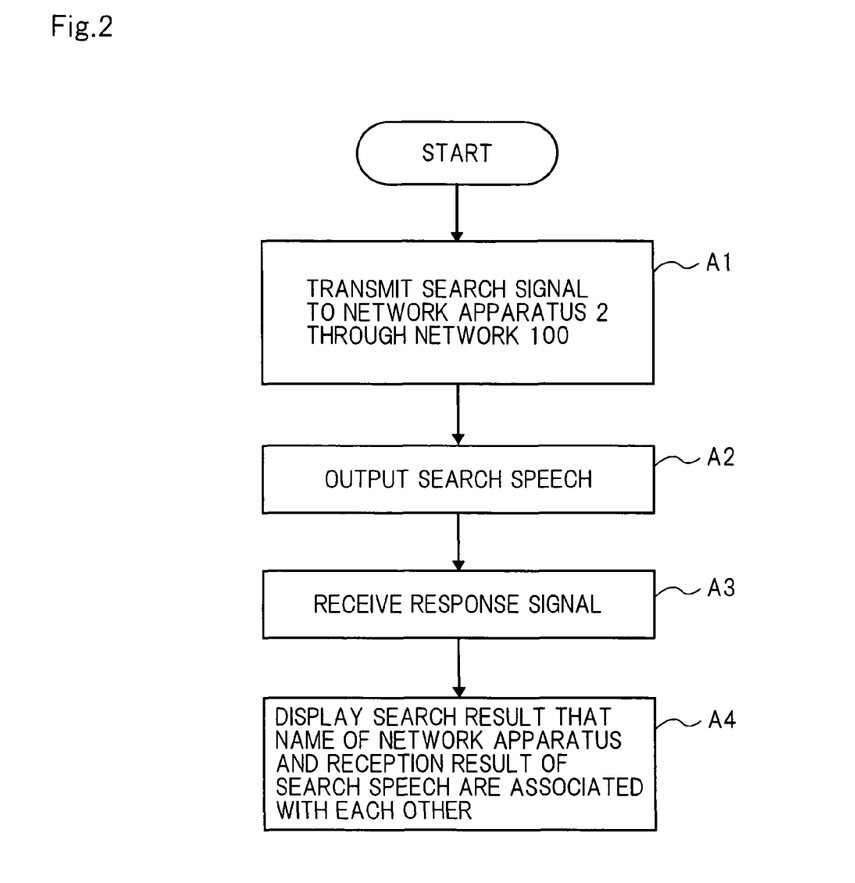
FIG. 2 is a flow chart indicating operating procedures in which the terminal provided in the network apparatus searching system of the exemplary embodiment searches for a network apparatus.

FIG. 2 is a flow chart showing operating procedures for terminal 1 that searches for a network apparatus.

When a user performs an operation for causing the CPU to execute a search for a network apparatus using input section 12, CPU 11 causes communication section 15 to transmit a search signal to all the network apparatuses (network apparatus 2 in the exemplary embodiment) connected to terminal 1 through network 100 (step A1).

In the operation of step A1, the search signal transmitted from communication section 15 includes the transmission date of the search signal and the identifier of the terminal. The identifier is a symbol allocated in advance to each terminal and may use a media access control (MAC) address, for example.

CPU 11 causes communication section 15 to transmit the search signal and then causes loudspeaker 16 to output a search speech (step A2). The following describes how network apparatus 2 responds to the operation of terminal 1 at steps A1 and A2.

Figure 3:
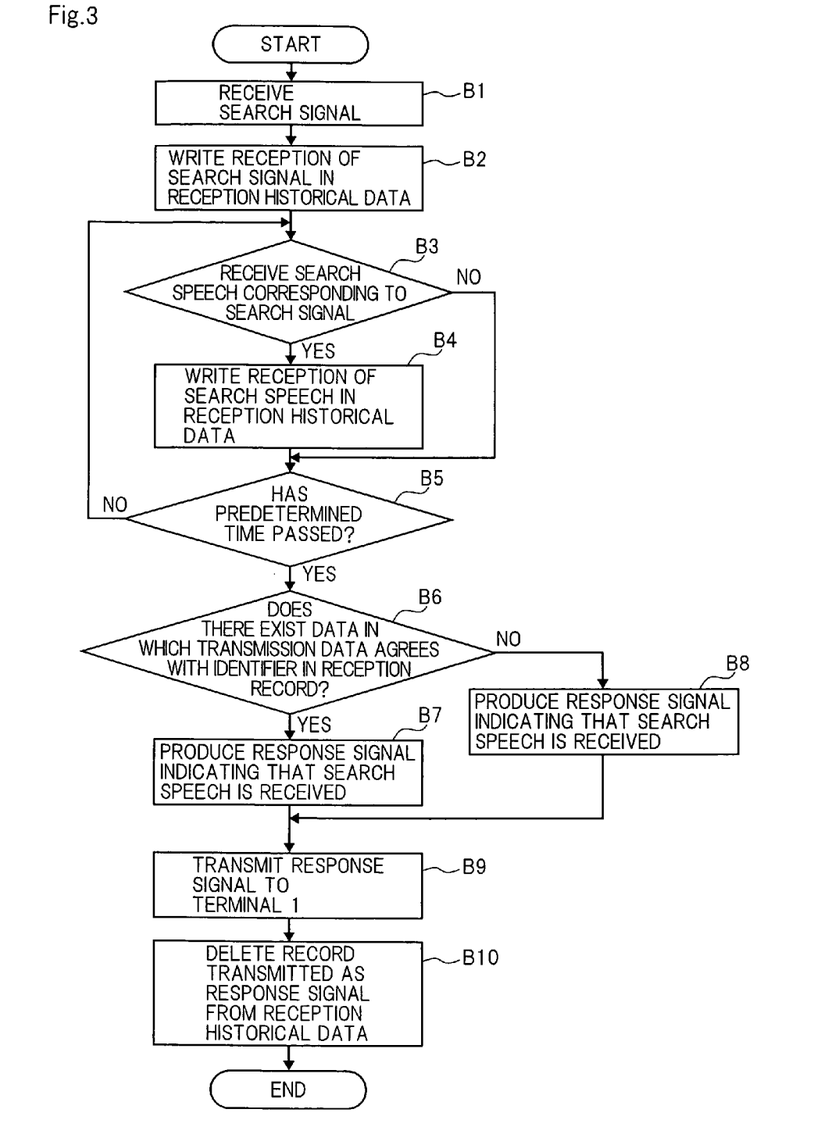
FIG. 3 is a flow chart indicating procedures for responsive operation of the network apparatus provided in the network apparatus searching system of the exemplary embodiment.

FIG. 3 is a flow chart showing procedures for responsive operation of network apparatus 2.

When communication section 23 receives the search signal transmitted from terminal 1 (step B1) and outputs it to CPU 21, CPU 21 writes the reception of the search signal into reception historical data stored in storage section 22 (step B2).

Figure 4:
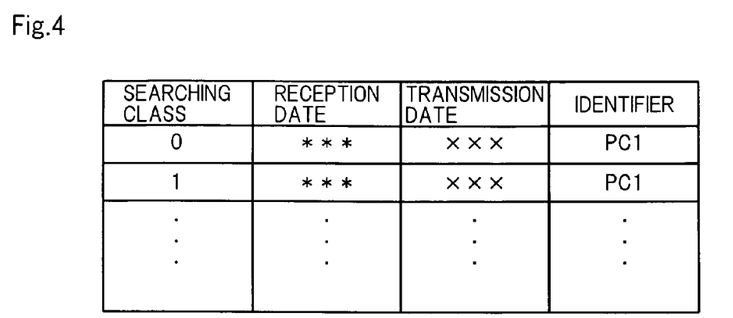
FIG. 4 is a table illustrating one example of the received historical data of the exemplary embodiment.

FIG. 4 is a table illustrating one example of the reception historical data of the exemplary embodiment.

The reception historical data illustrated in FIG. 4 is a record of a search signal and a search speech whose inputs are confirmed by CPU 21 and includes such items as searching class, reception date, transmission date and identifier.

The searching class is an item indicating whether a search speech is received or not. In the exemplary embodiment, if "0" is written in the searching class, "0" means that a search speech is not received. If "1" is written, "1" means that a search speech is received.

The reception date is an item indicating a date when network apparatus 2 receives a search signal. The transmission date and the identifier are items indicating the transmission date and the identifier indicated in the search signal received by network apparatus 2 respectively.

Following the operation of step B2, CPU 21 determines whether or not the search speech corresponding to the search signal received by communication section 23 in the operation of step B1 is received (step B3). Specifically, CPU 21 ascertains whether a speech signal corresponding to the search signal inputted from communication section 23 in the operation of step B1 is inputted from microphone 24. In other words, CPU 21 determines that the search speech is received when the level of the signal inputted from microphone 24 exceeds the threshold value.

In the operation of step B3, if CPU 21 ascertains that an applicable speech signal is inputted from microphone 24, CPU 21 writes the reception of the search speech in the reception historical data in the same manner as the operation at step B2 (step B4).

CPU 21 continues ascertaining whether an applicable speech signal has been inputted until a predetermined time passes (step B5). After the predetermined time has passed, CPU 21 searches each reception record shown in the reception historical data to determine whether there is data that indicating that the transmission date agrees with an identifier (step B6).

In the operation of step B6, it is ascertained whether network apparatus 2 has received the search speech outputted from terminal 1. If network apparatus 2 has received the search speech, network apparatus 2 may be regarded as being installed near terminal 1.

In the operation of step B6, if there is data indicating that transmission date agrees with an identifier, CPU 21 produces a response signal indicating the name of network apparatus 2 and indicating the symbol showing that the search speech has been received (step B7). Incidentally, the name of network apparatus 2 is stored in storage section 22.

In the operation of step B6, if there is not any data indicating that transmission date agrees with an identifier, CPU 21 produces a response signal indicating the name of network apparatus 2 and indicating the symbol showing that the search speech has not been received (step B8).

After CPU 21 has produced the response signal, CPU 21 causes communication section 23 to transmit the response signal to terminal 1 through network 100 (step B9). Next, the reception record transmitted to terminal 1 as the response signal is deleted from the reception historical data (step B10). With reference to the flow chart in FIG. 2, the operation of terminal 1 after the response signal has been transmitted by network apparatus 2 in described.

When communication section 15 receives the response signal from network apparatus 2 (step A3) and outputs it to CPU 11, CPU 11 causes display section 13 to display the search result in which the name of network apparatus 2 and the reception result of search speech indicated in the response signal are associated with each other (step A4).

Figure 5:
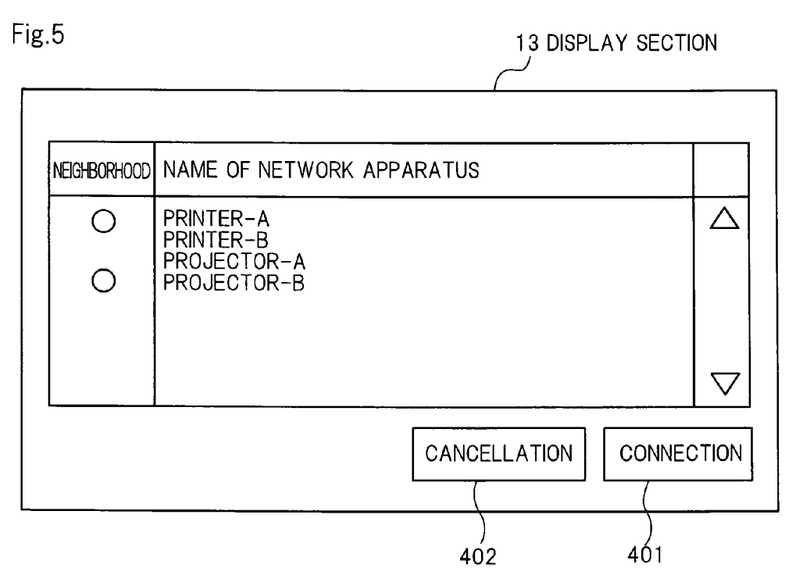
FIG. 5 is a table illustrating one example of a search result displayed by the terminal provided on the network apparatus searching system of the exemplary embodiment.

If a plurality of network apparatuses are connected to terminal 1 through network 100, CPU 11 may cause display section 13 to display a table, as illustrated in FIG. 5, in which the names of all network apparatuses that have transmitted the response signals during a predetermined standby period and the reception results of search speech are associated with each other, after the operation of step A2.

The table illustrated in FIG. 5 shows that the network apparatus with a circle in the item "neighborhood" receives the search speech outputted from terminal 1. If the user operates input section 12 to select any network apparatus from the table shown in FIG. 5 and depresses select button 401, CPU 11 transmits data to the network apparatus selected by the user. If the user operates input section 12 and depresses cancel button 402, CPU 11 causes display section 13 to terminate the display operation of the table.

If a plurality of network apparatuses are connected to the terminal through the network, the network apparatuses may be provided with measuring means for measuring the intensity of a search speech received by the microphone. In this case, each network apparatus transmits a response signal, indicating a value measured by the measuring means and the input sensitivity of the microphone to the terminal. Then, the terminal corrects the measured values using the input sensitivity and may display the search result in which the corrected values are associated with the names of the network apparatus.

In the above case, if a plurality of network apparatuses having the same application receive the search signal, the user of the terminal can discriminate the network apparatus installed nearest to the user.

If the network apparatus transmits a response signal indicating the intensity of a search speech to the terminal and if the terminal receives the response signal from a plurality of network apparatuses having the same application, the terminal may display only the network apparatus that is the greatest in the corrected value. In this case, the user of the terminal can save time in finding the network apparatus installed nearest to the user.

In the exemplary embodiment, position searching means (CPU 11, communication section 15 and loudspeaker 16) provided on terminal 1 outputs the search speech, responding means (CPU 21 and communication section 23) provided on network apparatus 2 transmits the response signal indicating whether the search speech has been received by microphone 24 to terminal 1 and the contents indicated in the response signal are displayed on terminal 1.

According to the exemplary embodiment, when a search for a network apparatus installed near terminal 1 is performed, position information of terminal 1 and network apparatus 2 in not used, but the results indicating whether network apparatus 2 has received the search speech transmitted from terminal 1 is used.

In the present invention, the network apparatus may transmit the response signal to the terminal only when the network apparatus receives both the search signal and the search speech. In this case, the network apparatus installed far away from the terminal (or, the network apparatus that cannot receive the search speech) is not displayed on the search result of the terminal. This prevents the user with the terminal from selecting a network apparatus installed far away from the user as the destination of data.

In the present invention, an ultrasonic wave may be used instead of a speech as a means of searching for a network apparatus installed near the terminal. In this case, ultrasonic wave transmitting means (not shown) for transmitting an ultrasonic wave with a signal corresponding to the search speech is provided on the terminal instead of the loudspeaker. The network apparatus is provided with supersonic receiving means (not shown) for receiving a signal transmitted from the terminal instead of the microphone. It is needless to say that others used as a microphone and a loudspeaker, may be used for an ultrasonic wave. It is convenient to use an ultrasonic wave instead of speech during the searching operation because an ultrasonic wave is inaudible to the human ear. In general, there are few apparatuses that generate ultrasonic waves in a meeting room or the like, so that malfunction due to unpredictable noise can be prevented which is not the case with the use of a speech.

If an ultrasonic wave is used, as is the case of the use of a speech, the network apparatus may transmit a response signal indicating the intensity of a reception signal to the terminal, the terminal may display the search result in which the intensity is associated with the name of the network apparatus. Alternatively, if the terminal receives the response signals from a plurality of network apparatuses having the same application, the terminal may display only the network apparatus in which the intensity of a receiving signal, that has been sent back from the apparatus, is the greatest.

If an ultrasonic wave is used, the search signal may be modulated with an ultrasonic wave as a carrier and transmitted not through the network. The network apparatus responds through the network. In this case, the traffic of a network can be reduced at the time of search.

The invention of the present application is described above in the exemplary embodiment. The invention of the present application is not limited to the contents described in the exemplary embodiment. Various modifications apparent to those skilled in the art may be made to the configuration and to details of the invention of the present application without departing from the scope of the invention of the present application.

The invention claimed is:

1. A terminal connected to a network apparatus through a network, said terminal comprising:
   a display section which performs a displaying operation; and
   a position searching device which, on receiving an instruction to make a search for the network apparatus, transmits a search signal indicating a specific content and a search speech corresponding to said search signal and then, on receiving a response signal, which includes information that corresponds to the search speech, from the network apparatus that receives the search signal through the network, causes the display section to display, on a basis of the response signal, information on the network apparatus that transmitted the response signal, wherein the search speech is inputted from a microphone located in the network apparatus.

2. The terminal according to claim 1, wherein the position searching means comprises:
   a loudspeaker which outputs speech with the specific content shown in the signal; and
   a CPU which, on receiving an instruction to make a search for the network apparatus, causes the loudspeaker to transmit the speech with the signal.

3. The terminal according to claim 2, wherein the position searching means, on receiving the response signal of the signal and a reception intensity from each of a plurality of network apparatuses, causes the display section to display information indicating each network apparatus based on the reception intensity.

4. The terminal according to claim 1, wherein the position searching means comprises:
   ultrasonic wave transmitting means which outputs the signal carried by an ultrasonic wave; and
   a CPU which, on receiving an instruction to make a search for the network apparatus, causes the ultrasonic wave transmitting means to transmit the signal carried by the ultrasonic wave.

5. The terminal according to claim 4, wherein the position searching means, on receiving the response signal of the signal and a reception intensity from each of a plurality of network apparatuses, causes the display section to display information indicating each network apparatus based on the reception intensity.

6. The terminal according to claim 1, wherein the position searching means, on receiving the response signal of the signal and a reception intensity from each of a plurality of network apparatuses, causes the display section to display information indicating each network apparatus based on the reception intensity.

7. A network apparatus connected to a terminal through a network, said network apparatus comprising: communication device which receives a search signal indicating a specific content and a search speech when the terminal transmits the signal; and responding device which determines whether the communication device has received the signal based on an output signal of the communication device and which transmits a response signal, on a basis of the received specific content and the search speech, indicating that the network apparatus has received the signal transmitted from the terminal if the responding device has determined that the communication device has received the signal indicating the specific content and the search speech corresponding to said search signal.

wherein the search speech is inputted from a microphone located in the network apparatus.

8. The network apparatus according to claim 7, wherein, if the responding means has determined that the communication means has not received the signal, the responding means transmits the response signal, indicating that the network apparatus has not received the signal to terminal.

9. The network apparatus according to claim 8, wherein the responding means comprises:
a communication section which communicates with the terminal through the network;
measuring means which measures an intensity of the signal if the communication means has received the signal; and
a CPU which causes the communication section to transmit the response signal indicating a value measured by the measuring means to the terminal.

10. The network apparatus according to claim 7, wherein the responding means comprises:
a communication section which communicates with the terminal through the network;
measuring means which measures an intensity of the signal if the communication means has received the signal; and
a CPU which causes the communication section to transmit the response signal indicating a value measured by the measuring means to the terminal.

11. The terminal according to claim 1, wherein the network apparatus determines whether the signal indicating the specific content, corresponding to said search signal received by the network apparatus, is received.

12. The terminal according to claim 1, wherein the network apparatus comprises a microphone and a communication section, and
wherein the network apparatus ascertains whether the signal indicating the specific content, corresponding to the search signal inputted from the communication section, is inputted from the microphone.

13. The terminal according to claim 12, wherein the network apparatus determines that the signal indicating the specific content is received when a level of a signal inputted from the microphone exceeds a threshold value.

14. A network apparatus searching system comprising a terminal and a network apparatus connected to the terminal through a network, wherein the terminal includes: a display section which performs a displaying operation; and
a position searching device which, on receiving an instruction to make a search for the network apparatus, transmits a search signal indicating a specific content and a search speech corresponding to said search signal and then, on receiving a response signal, which includes information that corresponds to the search speech, from the network apparatus that receives the search signal through the network, causes the display section to display, on a basis of the response signal, information on the network apparatus that transmitted the response signal,
wherein the search speech is inputted from a microphone located in the network apparatus.

15. The network apparatus searching system according to claim 14, further comprising:
a communication section which communicates with the terminal through the network;
measuring means which measures an intensity of the signal if the communication means has received the signal; and
a first CPU which causes the communication section to transmit the response signal indicating a value measured by the measuring means to the terminal,
wherein the position searching means includes a second CPU which causes the display section to display information in which the name of the network apparatus transmitting the response signal is associated with the measurement value indicated in the response signal, on receiving the response signal.

16. The network apparatus searching system according to claim 14, wherein the responding means includes:
a communication section which communicates with the terminal through the network;
measuring means which measures a reception intensity of the signal if the communication means has received the signal; and
a first CPU which causes the communication section to transmit the reception intensity and the response signal to the terminal; and
the position searching means includes a second CPU which causes the display section to display information indicating each network apparatus based on each reception intensity on receiving the response signal and on the reception signal from the plurality of network apparatus.

17. A network apparatus searching method used in a terminal connected to a network apparatus through a network, said method comprising:
a display section which performs a displaying operation; and
a position searching device which, on receiving an instruction to make a search for the network apparatus, transmits a search signal indicating a specific content and a search speech corresponding to said search signal and then, on receiving a response signal, which includes information that corresponds to the search speech, from the network apparatus that receives the search signal through the network, causes the display section to display, on a basis of the response signal, information on the network apparatus that transmitted the response signal,
wherein the search speech is inputted from a microphone located in the network apparatus.

18. The network apparatus searching method according to claim 17, further comprising:
transmitting a speech signal of speech on receipt of an instruction to search for the network apparatus.

19. The network apparatus searching method according to claim 17, further comprising:
transmitting the signal of an ultrasonic wave on receipt of an instruction to search for the network apparatus.

* * * * *